United States Patent
Huang

[11] Patent Number: 5,943,165
[45] Date of Patent: Aug. 24, 1999

[54] ADJUSTABLE HEAD MOUNTABLE STEREOSCOPIC VIEWER

[76] Inventor: Cheng-Chung Huang, 1610 Eagle Drive, Sunnyvale, Calif. 94087

[21] Appl. No.: 08/937,425

[22] Filed: Sep. 25, 1997

[51] Int. Cl.⁶ .................................................. G02B 27/24
[52] U.S. Cl. .......................... 359/472; 359/473; 359/477
[58] Field of Search ................... 359/472, 471, 359/473, 474, 477, 466, 479, 462

[56] References Cited

U.S. PATENT DOCUMENTS

| | | | |
|---|---|---|---|
| 933,844 | 9/1909 | Kellner . | |
| 4,568,970 | 2/1986 | Rockstead | 348/49 |
| 4,703,879 | 11/1987 | Kastendieck et al. | 359/477 |
| 4,740,836 | 4/1988 | Craig | 358/92 |
| 4,998,799 | 3/1991 | Brown | 359/466 |
| 5,124,840 | 6/1992 | Trumbull et al. | 359/472 |
| 5,357,369 | 10/1994 | Pilling | 359/462 |
| 5,486,841 | 1/1996 | Hara et al. | 359/462 |

FOREIGN PATENT DOCUMENTS

| | | | |
|---|---|---|---|
| 2508185 | 12/1982 | France . | |
| 782108 | 9/1957 | United Kingdom | 359/472 |

*Primary Examiner*—Jon Henry
*Attorney, Agent, or Firm*—David H. Jaffer

[57] ABSTRACT

An adjustable, head mountable stereoscopic viewer having a head band to mount the viewer to the user. A tilt bracket is pivotally joined on one end to the head band and at a pivot point on an opposite end to an optical assembly for adjustment of the assembly position to obtain maximum field of view. The optical assembly includes first (left) and second (right) mirror assemblies that receive and direct left and right stereo images from an image source, such as a poster, a TV image, etc., to the corresponding left and right eyes of the user. The left and right stereo images are displayed horizontally at the source, the right image preferably displayed above the left image. Each mirror assembly has two mirrors and an aperture, and functions in a similar manner to a periscope. Adjustment for a range of image sizes and distances is accomplished with a mirror adjustment, provided to vary the tilt of the mirror of one of the assemblies to adjust the overlap of the images. The optical assembly is adjustable about the pivot point to eliminate the unwanted upper (right) image from the left eye. An adjustable shutter plate is provided to restrict the optical opening to the right assembly for eliminating the unwanted lower (left) image from the right eye.

10 Claims, 3 Drawing Sheets

ADJUSTABLE HEAD MOUNTABLE STEREOSCOPIC VIEWER

BACKGROUND OF THE INVENTION

1. Field of the Invention

The present invention relates generally to stereoscopic viewers, and more particularly to an adjustable head mounted stereoscopic viewer using mirrors that accommodates different picture sizes and different viewing distances.

2. Brief Description of the Prior Art

Many different types of stereoscopic viewers have been designed and used over the years. The simplest of these are constructed as a single hand-held binocular device providing illumination and display of left and right image slides to a user's corresponding eyes. These devices provide high quality fixed images to a single viewer. The advent of motion pictures was followed by attempts to display and view this media in stereo. Attempts at this included the display of polarized left and right images viewed with corresponding polarized eye glasses. The quality and comfort of viewing in these applications was less than ideal. An attempt at stereo viewing of television images is described in U.S. Pat. 5,357,369 by Pilling et al., wherein a device is clamped to the screen/monitor. Like the hand held viewer, this apparatus can only be used by one observer at a time, and does not allow the user freedom of movement. An improved device is described in U.S. Pat. No. 4,740,836 by Craig that uses mirrors or prisms to direct left and right television images. This patent describes the devices as mounted in a pair of spectacles, but no disclosure of structure is given, and at this time such a device is not available on the market. Craig also requires the use of polarizers to eliminate unwanted images. The viewers as disclosed by Craig and others in the prior art, do not allow a user to conveniently view stereoscopic images in full color without significant image intensity loss. It is clear from the above description of the prior art that there is a need for a practical, inexpensive stereo viewer which will allow a number of users to view a single stereo image.

SUMMARY OF THE INVENTION

It is therefore an object of the present invention to provide an adjustable head mountable stereo viewer for viewing a remote image displayed on a television, posters, etc.

It is a further object of the present invention to provide a stereo viewer that has adjustment for viewing at various distances from an image.

It is a still further object of the present invention to provide a stereo viewer that has an improved apparatus for eliminating unwanted images.

It is a further object of the present invention to provide a stereoscopic viewer that has adjustment for viewing different picture sizes.

Briefly, a preferred embodiment of the present invention includes an adjustable, head mountable stereoscopic viewer having a head band to mount the viewer to the user, a tilt bracket, and an optical assembly. The tilt bracket is pivotally joined on one end to the head band and at a pivot point on an opposite end to the optical assembly for adjustment of the assembly position to obtain maximum field of view. The optical assembly includes first (left) and second (right) mirror assemblies that receive and direct left and right stereo images from an image source, such as a poster, a TV image, etc., to the corresponding left and right eyes of the user. The left and right stereo images are displayed horizontally at the source, the right image preferably displayed above the left image. Each mirror assembly has two mirrors and an aperture, and functions in a similar manner to a periscope. Adjustment for a range of image sizes and distances is accomplished with a mirror adjustment, for varying the tilt of one of the mirrors in one of the assemblies to set the overlap of the images. The optical assembly is adjustable about the pivot point to eliminate the unwanted upper(right) image from the left eye. An adjustable shutter plate is provided to restrict the optical opening to the right assembly for eliminating the unwanted lower(left) image from the right eye.

An advantage of the stereoscopic viewer of the present invention is that it provides clear, undistorted stereo images of a variety of displays, including television, posters, etc.

A further advantage of the stereoscopic viewer of the present invention is that it has adjustments for accommodating various image sizes and viewing distances.

A still further advantage of the present invention is that it provides a head mounted stereoscopic viewer that can be adjusted to obscure unwanted images without the use of polarizers.

Another advantage of the present invention is that it provides a head mounted stereoscopic viewer that is simple and economical of construction.

IN THE DRAWING

DESCRIPTION OF THE PREFERRED EMBODIMENT

Figure 1:
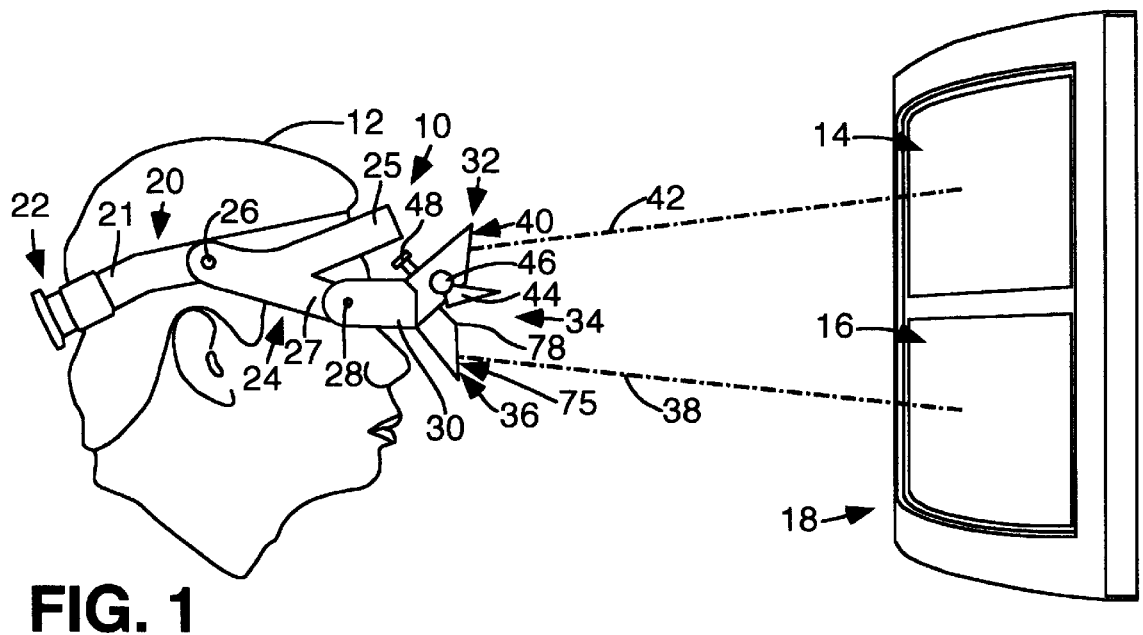
FIG. 1 shows a user wearing the stereoscopic viewer for viewing left and right stereo images arranged horizontally on a TV screen, one above the other, with the left and right images positioned in the order of first and second rows respectively.

The preferred embodiment of the stereoscopic viewer 10 of the present invention and its use are illustrated in FIG. 1 of the drawing. The viewer 10 is shown mounted on the head of the user 12 and serves to receive and direct a right image 14 and a left image 16 to the users corresponding right and left eyes. The display 18 can be any surface or source, such as a television, computer monitor, projection screen, poster or even a book. The viewer 10 includes a head mount 20, a tilt band 24 and an optical assembly 34. The head mount 20 includes a band 21, and a size adjustment apparatus 22. The tilt band 24 includes a portion 25 that arcs around the band 21, and is pivotally attached thereto on both ends as indicated at 26. Two extensions 27, one on each side of the viewer 10, protrude forward from portion 25 and are pivotally attached at pivot point/axis 28 to two brackets 30, one extending from each side of the housing 32 of the assembly 34. The tilt band 24 allows for adjustment of the position of the optical assembly 34, the purpose being to align it with the user's eyes and direct it to properly adjust the field of view of the images 14 and 16. The distance between the pivot points 26 and 28 is designed to be sufficient to space the optical assembly 34 from the user's face so as to allow clearance for conventional corrective eye glasses (not shown). A first mirror assembly 36 serves to receive and direct the left image 16 along optical path 38 to the user's left eye. A second mirror assembly 40 receives the right image 14 along optical path 42 and redirects it to the user's right eye. The second assembly 40 also includes a shutter plate 44 that can be rotated with a knob 46 for the purpose of restricting the optical path to the assembly 40 in order to eliminate an image to the right eye of the left stereo image 16. A mirror tilt adjustment knob 48 is shown on assembly 40 for the purpose of allowing the user to vary the overlap of the right and left images to accommodate various image sizes and viewing distances.

The details of the apparatus and its use will be more fully described in the following text in reference to the various figures of the drawing.

Figure 2:
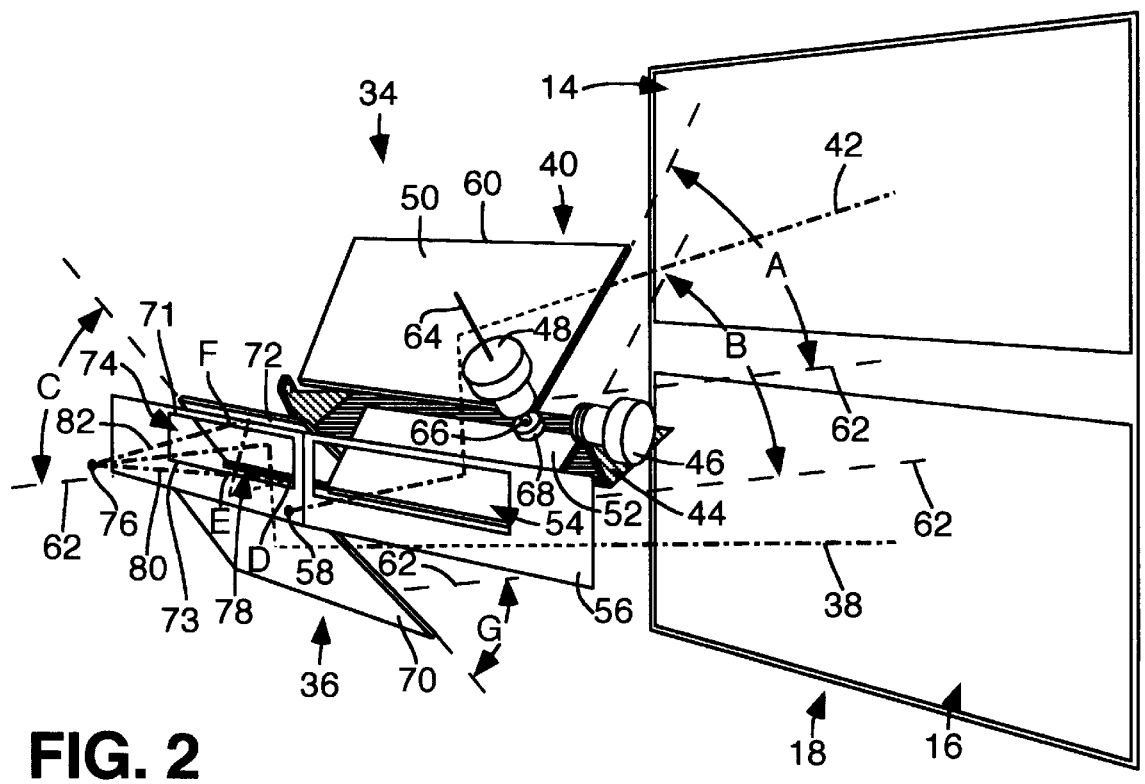
FIG. 2 is a perspective view showing the arrangement of parts internal to the optical assembly.

FIG. 2 is a perspective view showing various parts of the optical assembly 34 illustrating the construction, and operation of receiving and directing the images 14 and 16 from the display 18. The view of FIG. 2 omits portions of the assembly 34, such as the housing 32 with bracket 30 in order to more clearly show the internal parts. The figure illustrates light from the right image 14 traveling along optical path 42 to the second(right) mirror assembly 40, reflected from mirror 50 to mirror 52, and then out the exit aperture 54 of plate 56 to the pupil 58 of the user's right eye.

FIG. 2 also shows further detail of the mirror adjustment referred to in discussion of the knob 48 of FIG. 1. The mirror 50 is pivotally mounted along edge 60 to the housing 32 (FIG. 1) at an angle "A" of approximately 45 degrees to a horizontal line 62 when in normal use as shown. The exact angle A is adjustable by turning the knob 48 around an axis 64,which turns a threaded rod 66 in a nut 68 attached to the mirror 50. The range of adjustment of the angle "A" is preferably from 41 to 49 degrees to the horizontal. Mirror 52 is mounted at an angle "B" of about 45 degrees to the horizontal. The adjustment of the angle A of mirror 50 allows an angular separation (A–B) of mirrors 50 and 52 from approximately a positive 4 degrees to a negative 4 degrees. This adjustment allows the user to vary the overlap of the right and left images, allowing correct adjustment for varying image sizes and viewing distances.

The first(left) mirror assembly 36 also contains two mirrors 70 and 72, oriented at approximately 90 degrees from the orientation of mirrors 50 and 52 of the second assembly 40, and therefore at approximately –45 degrees to a horizontal line 62. A preferred orientation of mirror 70 is an angle "G" of 49 degrees to the horizontal 62, and a preferred orientation of mirror 72 is at an angle "C" of 45 degrees to a horizontal 62. FIG. 2 illustrates light traveling from left image 16 along path 38 to mirror 70, which is reflected to mirror 72 and then directed out the exit aperture 74 to pupil 76.

FIG. 2 shows further detail of the shutter plate 44 which is rotatably attached to the housing 32 (FIG. 1) and adjusted in orientation using knob 46. The purpose and operation of the shutter 44 can now be more fully understood as follows. The image of the left picture 16 to the left eye and the right picture 14 to the right eye are the only two useful images for stereoscopic viewing. Two unwanted images of the pictures 14 and 16 can also be seen by the user, namely, the image of the right picture 14 to the left eye and the image of the left picture 16 to the right eye. The present invention allows the user to obscure these unwanted images without the use of polarization techniques implemented in prior art designs. To block the image of the right picture from view by the left eye, the user tilts the optical assembly 34 about the pivot point 28 (FIG. 1) to position the edge 71 of aperture 74 in front of the left eye so as to block the image from the right picture 14. In order to block the left image from view by the right eye, the user adjusts the shutter plate 44 with knob 46.

An optimum sequence of adjustment of the stereoscopic viewer is as follows. First, the user adjusts the band 24 to align the optical assembly 34 with respect to the user's eyes for a maximum view of the images 14 and 16. As an aid to facilitate this adjustment, the present invention includes field of view alignment apparatus including a strip 78 with a point "D" placed on the upper edge of the opening 75 of the assembly 36, shown in FIG. 1. This strip 78 and the aperture edge 73 with point E are to be positioned along an optimum "line of sight". This is done by adjusting the tilt of assembly 34 until the user observes the strip 78 and point D lie on the edge 73 of the aperture 74 with point E. The upper edge 71 of the aperture 74 with a point F indicated, is located by design relative to the lower edge 73 so that when the image of point D is seen in line with the lower edge 73 and point E, a second image of point D is seen in alignment with the upper edge 71 and point F. This adjustment, again, gives the user a maximum field of view. In order to accomplish this, the optical assembly 34 is designed so that the second image in line with the upper edge 71 and point F travels along the zig zag path 82 from point D to lower mirror 70 to upper mirror 72 and out the exit aperture 74. The image of point D that occurs in line with the lower edge 73 and point E, travels along a direct path 80 from point D to the lower edge 73, without reflection by either of mirrors 70 or 72. This is more clearly illustrated in FIG. 4A which shows the direct path 80 intersecting the edge/strip 78 and the edge 73 of the aperture 74. It should be noted that although the strip 78 and points D, E and F are described as a preferred embodiment, alternative markings could be used. For example, the strip 78 could be used without the mark D, or the edges 73 and 71 without the points E and F, or other marks could be used. These variations are all to be included in the spirit of the present invention.

Following the above described adjustment for maximum field of view, the mirror angle adjustment knob 48 is used to set the proper overlap of the right and left images. The user then moves his head or adjusts the optical assembly 34 about the pivot point 28 to further position the left aperture 74 so as to block the right image from the left eye. Finally, the shutter 44 is adjusted by way of knob 46 to block the left image from the right eye.

When the above adjustments are made, the performance of the stereoscopic viewer is relatively insensitive to normal pitch/yaw/roll and lateral translation movements of the user's head. Therefore, no further adjustments need to be made to the apparatus.

Figure 3:
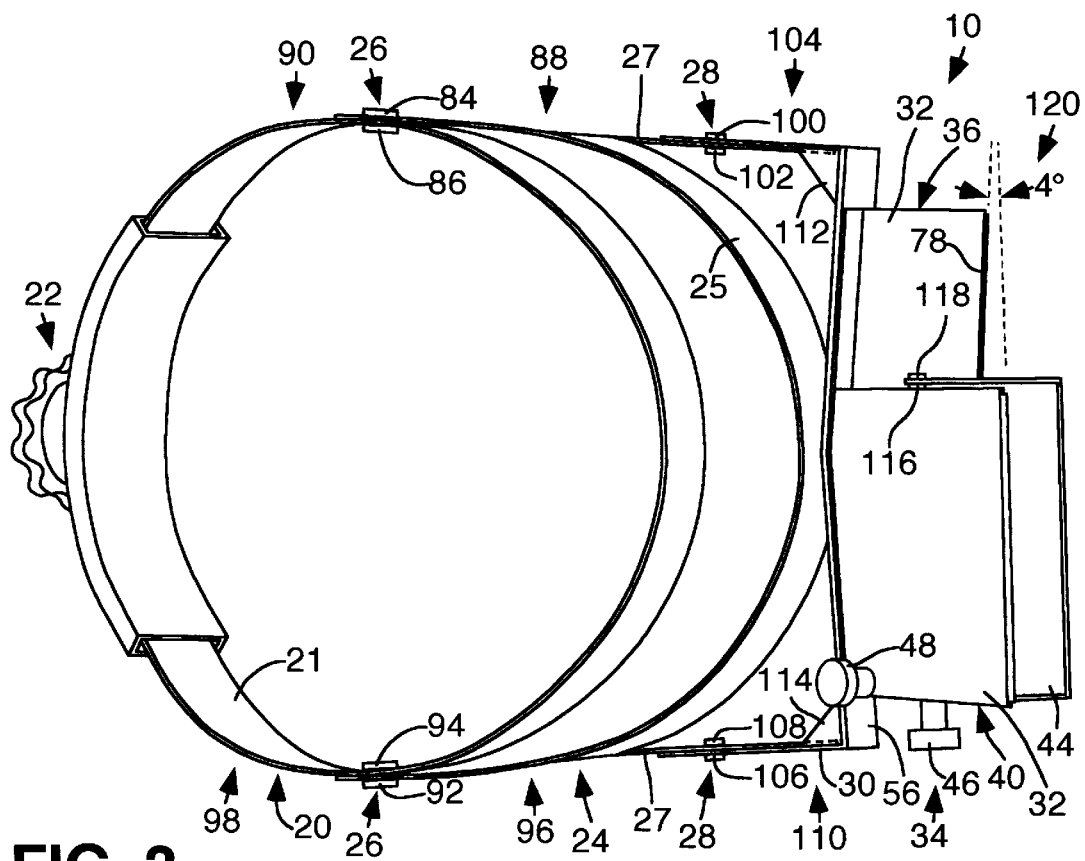
FIG. 3 is a top view of the stereoscopic viewer showing various construction details including an inward tilt of the left and right mirror assemblies.

FIG. 3 is a top view of the stereoscopic viewer 10. The construction according to the preferred embodiment includes attachment of various parts with rivets. Other construction methods known to those skilled in the art are also included in the spirit of the present invention. The embodiment as shown in FIG. 3 includes rivet 84–86 joining the left side 88 of the tilt band 24 to the left side 90 of the head band 20. Rivet 92–94 joins the right side 96 of tilt band 24 to the right side 98 of the head band 20. Rivets 100–102 and 106–108 secure the optical assembly 34 to the tilt band 24 at the pivot point 28. Rivet 100–102 joins the left side 104 of the bracket 30 to the left side 88 of the tilt band 24. Rivet 106–108 joins the right side 110 of the bracket 30 to the right side 96 of the tilt band 24. Angle braces 112 and 114 are used to strengthen the bracket 30 where it joins the face plate portion 56 and to restrict the amount of tilt of the bracket 30.

The shutter plate 44 is pivotally attached to the housing 32 and connected to adjustment knob 46 on one side of the second (right) mirror assembly 40. The pivotal connection of the knob 46 to the housing and secure connection to the plate 44, can be done with a rivet type of connection to the plate 44 or by other means known to those skilled in the art. The plate 44 is connected to the opposite side of the assembly 40 by way of spacer 116 and rivet 118.

FIG. 3 also illustrates an additional important feature of the present invention. The first (left) mirror assembly 36 and second (right) mirror assembly 40 are angled toward each other at about 2 degrees in the horizontal plane or i.e. a total of 4 degrees as indicated in FIG. 3 at 120. The purpose of the 4 degrees tilt is to improve the alignment of the left and right fields of view in the horizontal direction.

Figure 4A:
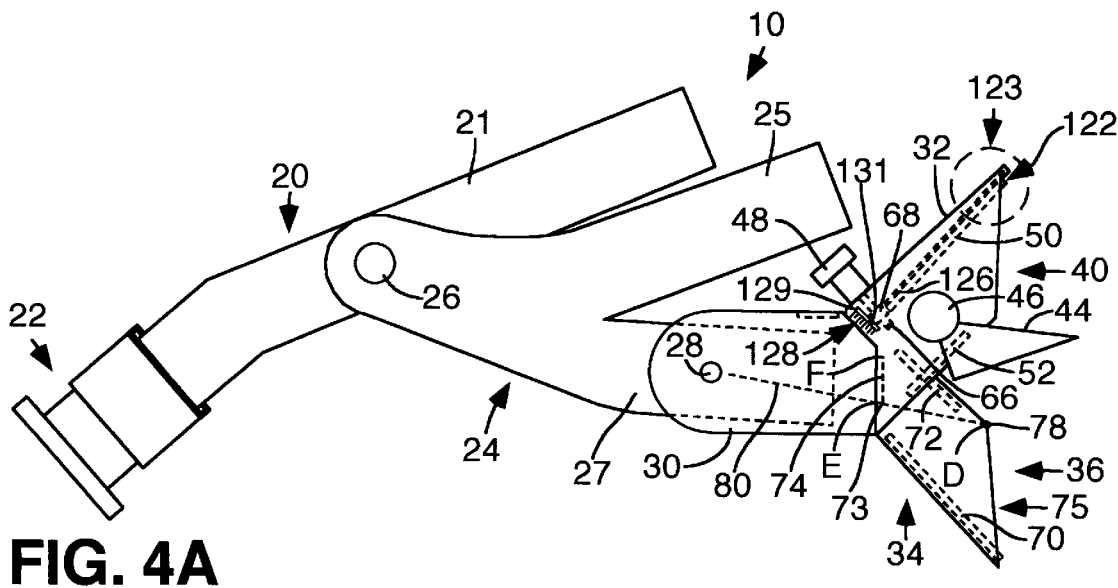
FIG. 4A is a side view of the stereoscopic viewer for clarifying the mirror positions and adjustment apparatus.
Figure 4B:
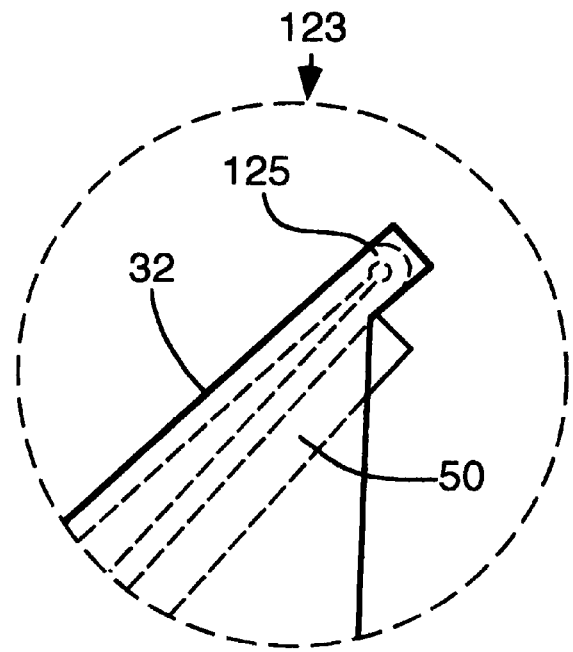
FIG. 4B is an enlargened view showing a mirror hinge.

FIG. 4A is a side view of the stereoscopic viewer 10. The positions of mirrors 50 and 52 of the second (right) mirror assembly 40 and the mirrors 70 and 72 of the first (left) mirror assembly 36 are clearly shown. Mirrors 70, 72 and 52 are mounted in a fixed position to the housing 32. One edge 122 of mirror 50 is pivotally mounted to the housing 32. This is more clearly shown in the enlargement of area 123 in FIG. 4B showing a hinge 125 attached to housing 32 and mirror 50. The opposite edge 126 of the mirror 50 is flexibly attached to the nut 68 through which threaded member 66 passes. Adjustment of the mirror 50 angle relative to mirror 52 is accomplished by rotating member 66 with knob 48. A scale 128 on the housing 32 can be used to adjust the mirror 50 angle according to the ratio of the center spacing of the images 14 and 16 to the viewing distance. FIG. 4A shows a slotted opening 129 in the housing 32 through which an indicator 131 extends. The indicator 131 extends into the housing 32 and is attached to the edge 126 of the mirror by any of various ways, such as to the nut 68 as indicated. The position of the indicator relative to the scale 128 gives a visual indication of the mirror tilt.

Figure 5:
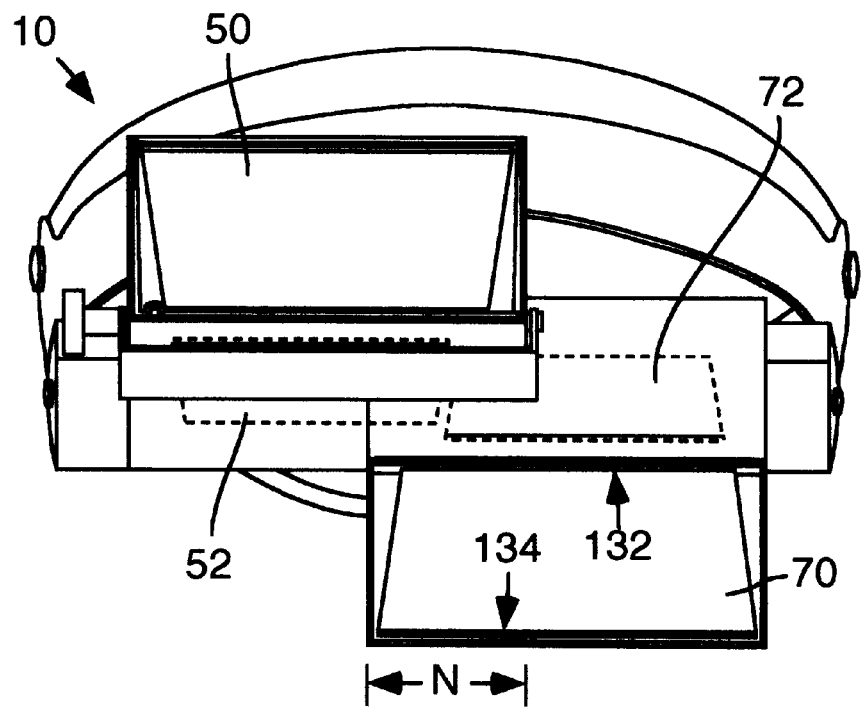
FIG. 5 is a front view of the stereoscopic viewer illustrating the use of trapezoidal mirrors.

FIG. 5 is a front view of the stereoscopic viewer 10. This view shows another feature of the present invention. The mirrors 50, 52, 70 and 72 are preferably trapezoidal in shape. This is clearly illustrated in FIG. 5. The purpose of trapezoidal mirrors, where one side, such as 132, is shorter than the opposite side 134, is to minimize the mirror size for the full view of the images 14 and 16, which have a rectangular shape. FIG. 5 also shows another feature of the invention, which is an overlap "N" of the first(left) and second(right) mirror assemblies. This overlap is for the purpose of optimizing the field of view of the stereoscopic viewer.

The construction and combination of features of the stereoscopic viewer of the present invention are given by way of example of the preferred embodiment. Other combinations of the novel features presented and other ways of constructing an equivalent viewer will be apparent to those skilled in the art. These various combinations and constructions are to be included in the spirit of the present invention. For example, the head mount 20, shown as an adjustable band, could be in the form of a helmet. The tilt band 24 is shown constructed with a band portion 25 with extensions 27. Other ways of flexibly attaching the optical assembly 34 to the head mount 20 will be apparent to those skilled in the art, and these are also included in the spirit of the present invention. For example, the band 24 could alternatively be constructed using a semi flexible material without rivet hinges at either point/axis 28 or 26, and/or without the band shaped portion 25. Also, other ways of adjusting the mirror 50 will be apparent to those skilled in the art and these are included in the spirit of the present invention.

The shutter plate described above is applied to the right mirror assembly. Alternatively, it could be applied to the left. Variations in construction of other features are also possible, such as the arrangement for viewing a right image 14 displayed over a left image. The apparatus of the present invention could be reconfigured to view a display with a left image over a right image. Such variations in symmetry and other variations that will be apparent to those skilled in the art are included in the spirit of the present invention.

It is therefore intended that the appended claims be interpreted as covering all such alterations and modifications as fall within the true spirit and scope of the invention.

What is claimed is:

1. A stereoscopic viewer comprising:
    (a) optical assembly means including
        (i) first mirror assembly means for directing a left stereo image from a remote source to a user's left eye, said remote source having said left stereo image and a right stereo image displayed with one of said images displayed above the other of said images;
        (ii) second mirror assembly means for directing said right stereo image from said remote source to user's right eye;
    (b) tilt means for adjusting the position of said optical assembly means relative to a user's right and left eye;
    (c) head mount means for securing said viewer to a user's head; and
    (d) adjustable shutter plate means including a rotatably adjustable fixed size plate for restricting the optical path of said second mirror assembly means for the purpose of obscuring an image to the right eye of said left stereo image.

2. A stereoscopic viewer as recited in claim 1 wherein said first mirror assembly means includes
    (a) a first mirror assembly;
    (b) a second mirror assembly; and
    (c) mirror adjustment means for adjusting an angle of orientation between said first mirror and said second mirror;
    whereby a user can adjust a degree of overlap of said left image and said right image to accommodate different sizes of images and a range of distances of said viewer from said source.

3. A stereoscopic viewer as recited in claim 1 wherein said tilt assembly means can be adjusted to allow space for a user to wear corrective eye glasses when using said viewer.

4. A stereoscopic viewer as recited in claim 1 wherein said head mount means includes head mount adjustment means to accommodate a range of head sizes.

5. A stereoscopic viewer as recited in claim 1 wherein said first and second mirror assembly means each include mirrors of trapezoidal shape for minimizing the size of said mirrors for observing images of rectangular shape.

6. A stereoscopic viewer as recited in claim 1 wherein said first mirror assembly horizontally overlaps said second mirror assembly for improving the field of view for said viewer.

7. A stereoscopic viewer as recited in claim 1 wherein said optical assembly means further includes field of view alignment means for use in adjusting the alignment of said optical assembly means relative to the eyes of a user for maximum field of view.

8. A stereoscopic viewer as recited in claim 7 wherein said field of view alignment means includes a strip positioned on an upper edge of an optical path entrance opening of said first mirror assembly, and a lower edge of an optical path exit aperture;
    wherein said user adjusts a position of said optical assembly means to visually align said strip with said lower edge.

9. A stereoscopic viewer as recited in claim 1 wherein said first mirror assembly means and said second mirror assembly means are angled towards each other at an angle for the purpose of aligning right and left fields of view in a horizontal direction.

10. A stereoscopic viewer as recited in claim 9 wherein said angle is in the range of 2 to 6 degrees.

* * * * *